US012088584B2

United States Patent
N et al.

(10) Patent No.: US 12,088,584 B2
(45) Date of Patent: Sep. 10, 2024

(54) AUTHENTICATION TOKEN MANAGEMENT FOR MULTIPLE PROCESSES AND REPRESENTATIONAL STATE TRANSFER CLIENTS

(71) Applicant: EMC IP Holding Company LLC, Hopkinton, MA (US)

(72) Inventors: Vaneeswaran N, Bangalore (IN); Pushpendra Sinha, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 18/343,648

(22) Filed: Jun. 28, 2023

(65) Prior Publication Data

US 2023/0344826 A1    Oct. 26, 2023

Related U.S. Application Data

(62) Division of application No. 17/083,992, filed on Oct. 29, 2020, now Pat. No. 11,750,600.

(51) Int. Cl.
*G06F 21/00* (2013.01)
*H04L 9/40* (2022.01)

(52) U.S. Cl.
CPC ........ *H04L 63/0853* (2013.01); *H04L 63/108* (2013.01)

(58) Field of Classification Search
CPC ............... H04L 63/0853; H04L 63/108; H04L 63/0815; H04L 67/02; H04L 67/10; H04L 63/0807; G06F 21/33
See application file for complete search history.

(56) References Cited

U.S. PATENT DOCUMENTS

| | | | | |
|---|---|---|---|---|
| 8,336,089 | B1 * | 12/2012 | Ahmed | G06F 21/602 |
| | | | | 726/5 |
| 10,841,316 | B2 * | 11/2020 | Innes | H04L 63/0823 |
| 2009/0235349 | A1 * | 9/2009 | Lai | H04L 63/0807 |
| | | | | 726/10 |
| 2015/0089623 | A1 * | 3/2015 | Sondhi | H04L 63/205 |
| | | | | 726/9 |
| 2016/0277413 | A1 * | 9/2016 | Ajitomi | H04L 67/12 |
| 2018/0212774 | A1 * | 7/2018 | Schefenacker | H04L 9/3213 |
| 2020/0336494 | A1 * | 10/2020 | Kitagata | H04L 63/0807 |
| 2021/0243024 | A1 * | 8/2021 | Modi | H04L 9/001 |
| 2022/0108026 | A1 * | 4/2022 | Ortiz | G06F 21/602 |

FOREIGN PATENT DOCUMENTS

CA    2845695 A1 *    9/2014    .......... G06F 11/3055

* cited by examiner

*Primary Examiner* — Kendall Dolly
(74) *Attorney, Agent, or Firm* — Staniford Tomita LLP

(57) ABSTRACT

Embodiments for processing authentication tokens in a system with multiple Representational State Transfer (REST) servers and clients. An intelligence process for multiple processes or multiple REST clients in an OS effectively communicates with multiple REST servers and proactively manages each server's authentication token. A shared library is loaded into a process that uses shared memory to manage the generation and expiry of a token and to communicate with a supported REST server through a single function call. The REST Authentication token will be generated for each REST server and stored in the shared memory which will be reused across multiple processes that use the library. The REST token will be validated for each function call.

20 Claims, 8 Drawing Sheets

600

| Method 602 | Equivalent Operations 604 | Single Function Call 606 |
|---|---|---|
| POST for AWS | • Generate Token for AWS<br>• Build curl object<br>    o Initialize curl library<br>    o Set Headers<br>    o Set Token<br>    o Set content type<br>    o Set Body<br>    o Set Request Type as POST<br>    o Set callback function<br>    o Set URI<br>    o Etc.,<br>• Execute curl | execute_rest_method(AWS, POST, URI, BODY) |
| GET for AWS | • Generate Token for AWS<br>• Build curl object<br>    o Initialize curl library<br>    o Set Headers<br>    o Set Token<br>    o Set content type<br>    o Set Request Type as GET<br>    o Set callback function<br>    o Set URI<br>    o Etc.,<br>• Execute curl | execute_rest_method(AWS, GET, URI, BODY) |
| GET for GCP | • Generate Token for GCP<br>• Build curl object<br>    o Initialize curl library<br>    o Set Headers<br>    o Set Token<br>    o Set content type<br>    o Set Request Type as GET<br>    o Set callback function<br>    o Set URI<br>    o Etc.,<br>• Execute curl | execute_rest_method(GCP, GET, URI, BODY) |
| POST for GCP | • Generate Token for GCP<br>• Build curl object<br>    o Initialize curl library<br>    o Set Headers<br>    o Set Token<br>    o Set content type<br>    o Set Body<br>    o Set Request Type as POST<br>    o Set callback function<br>    o Set URI<br>    o Etc.,<br>• Execute curl | execute_rest_method(GCP, POST, URI, BODY) |

FIG. 6

AUTHENTICATION TOKEN MANAGEMENT FOR MULTIPLE PROCESSES AND REPRESENTATIONAL STATE TRANSFER CLIENTS

CROSS-REFERENCE TO RELATED APPLICATIONS

The present application is a Divisional application and claims priority to U.S. patent application Ser. No. 17/083,992, filed on Oct. 29, 2020, entitled "Authentication Token Management for Multiple Processes and Representational State Transfer Clients," and assigned to the assignee of the present application.

TECHNICAL FIELD

Embodiments are generally directed to distributed networks, and more specifically to handling multiple representation state transfer (REST) clients.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Representational state transfer (REST) is a software architecture style that defines a set of constraints to be used for creating web services. Web services that conform to the REST architectural style, called "RESTful" web services, provide interoperability between computer systems on the Internet. RESTful Web services allow the requesting systems to access and manipulate textual representations of web services by using a uniform and predefined set of stateless operations. Web services are generally documents or files identified by their Uniform Resource Locators (URLs). However, today they have a much more generic and abstract definition that encompasses every entity, or action that can be identified, named, addressed, handled, or performed on the web. In a RESTful web service, requests made to a resource's identifier will elicit a response with a payload formatted in HTML. XML. JSON, or some other format. The response can confirm that some alteration has been made to the resource state, and the response can provide hypertext links to other related resources. By using a stateless protocol and standard operations, RESTful systems can achieve high performance, reliability, and scalability by reusing components that can be managed and updated without affecting the system as a whole, even while it is running.

If there are multiple REST servers and multiple processes, communication between them becomes challenging, each process needs to manage an authentication token for each REST server. There is a processing overhead associated with every process and hence, a possible negative performance impact. In order to communicate with the REST server, stakeholders need to take care of authentication mechanisms, keep track of authentication token expiry times, and build the HTTP/HTTPS/cURL objects with URI, Body, AUTH in their programming language to execute a REST API call. There are apparently no known solutions to efficiently share and manage the REST authentication token between multiple REST client processes and servers, thus adding further processing overhead to present systems.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. DellEMC, NetWorker, Data Domain, Data Domain Restorer, and PowerProtect Data Manager (PPDM) are trademarks of DellEMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

FIG. 6 is a table listing some example single function calls to invoke certain REST methods for a process, under some embodiments.

DETAILED DESCRIPTION

Figure 1A:
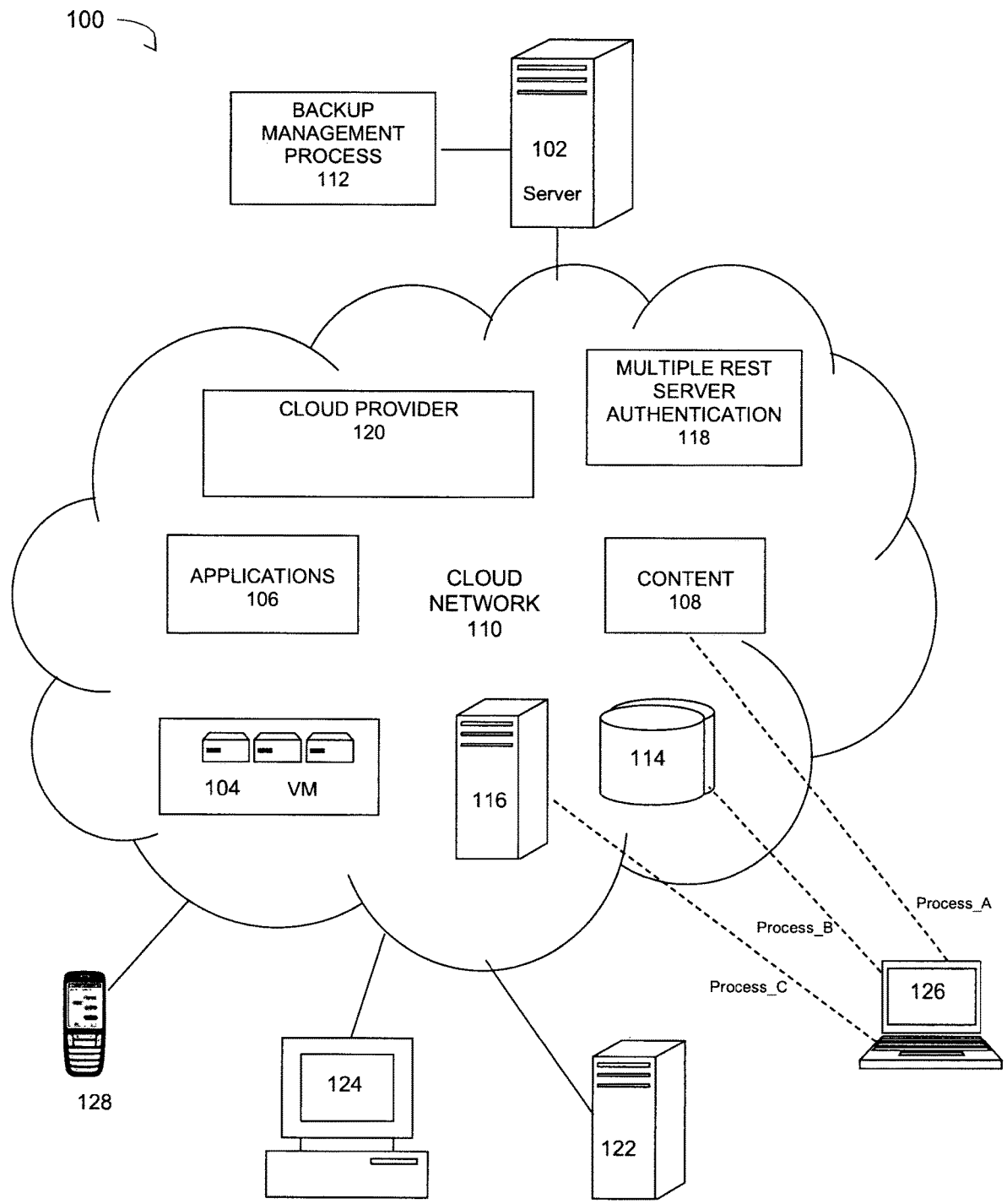
FIG. 1A is a diagram of a cloud network implementing a multiple REST server authentication process, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. The computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory.

Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve automated backup techniques in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Network 110 provides connectivity to the various systems, components, and resources of system 100, and may be implemented using protocols such as Transmission Control Protocol (TCP), Internet Protocol (IP), and/or User Datagram Protocol (UDP), well known in the relevant arts. In a distributed network environment, network 110 may represent a cloud-based network environment in which applications, servers and data are maintained and provided through a centralized cloud-computing platform. As is known, cloud networks provide on-demand availability of computer resources, such as applications 106, processing power 116, storage 114, content 108, and other possible resources. These resources are provided without requiring direct management by the user or consumption of much, if any, local (user client) computing resources. The cloud network can also support large data centers that provide large amounts of storage and compute resources for large-scale applications and use cases. The cloud may be embodied within single networks or distributed networks implemented by many servers in multiple locations.

Cloud networks are implemented by cloud service providers 120 who are vendors that provide IT (information technology) functions over the Internet. As shown in FIG. 1A, cloud provider 120 provides access to cloud network 110 from different client users operating any appropriate local computer or device, such as server 122, personal computer 124, laptop/notebook computer 126, mobile phone or tablet 128, or any other similar networkable device. In general, cloud provider services range from full application development platforms to servers, storage, and virtual desktops. Examples of popular present cloud providers include AWS (Amazon Web Services), Microsoft Azure, Google Cloud Platform (GCP). IBM Cloud Services, and many others.

Application program interfaces (APIs) are generally considered the best way for organizations and users to access services provided by cloud providers or other service providers. Cloud consumers use APIs as software interfaces to connect and consume resources such as by using RESTful protocol-based API. As commonly understood, APIs generally are software interfaces that optimize development of an application or service for data processing. Since cloud services are inherently distributed, the use of web-based RESTful APIs by users is a logical solution for the remote consumption of cloud resources. RESTful APIs follow the service-oriented architecture (SOA) model and, therefore, are often used by web service-based software architectures through XML or JSON for integration purposes. This means that they are consumed through an Internet browser or by web servers.

In system 100, each cloud resource (e.g., applications 106, content 108, VMs 104, etc.) are each supported by a respective REST server. Each client 122-128 typically runs different processes to access the different resources available in the cloud, and different OS threads may spun up to access the REST servers for these processes. Thus, for the example shown, client 126 may execute three separate processes to access the desired cloud resources, such as Process A to access the content 108, Process B to access storage 114 (such as through a backup operation), and Process C to access needed processor resources 116. Other or additional processes may also be used by client 126. Likewise, each of the other clients 122, 124, and 128 may each execute multiple processes to access respective resources as well.

FIG. 1A illustrates an embodiment in which the client-server network implementing a REST server authentication process 118 is embodied in a large-scale cloud network. It should be noted that embodiments are not so limited and any network implementation may be used, such as a private cloud or local area network (LAN). Embodiments can also be applied to on-premises client-server systems.

Figure 1B:
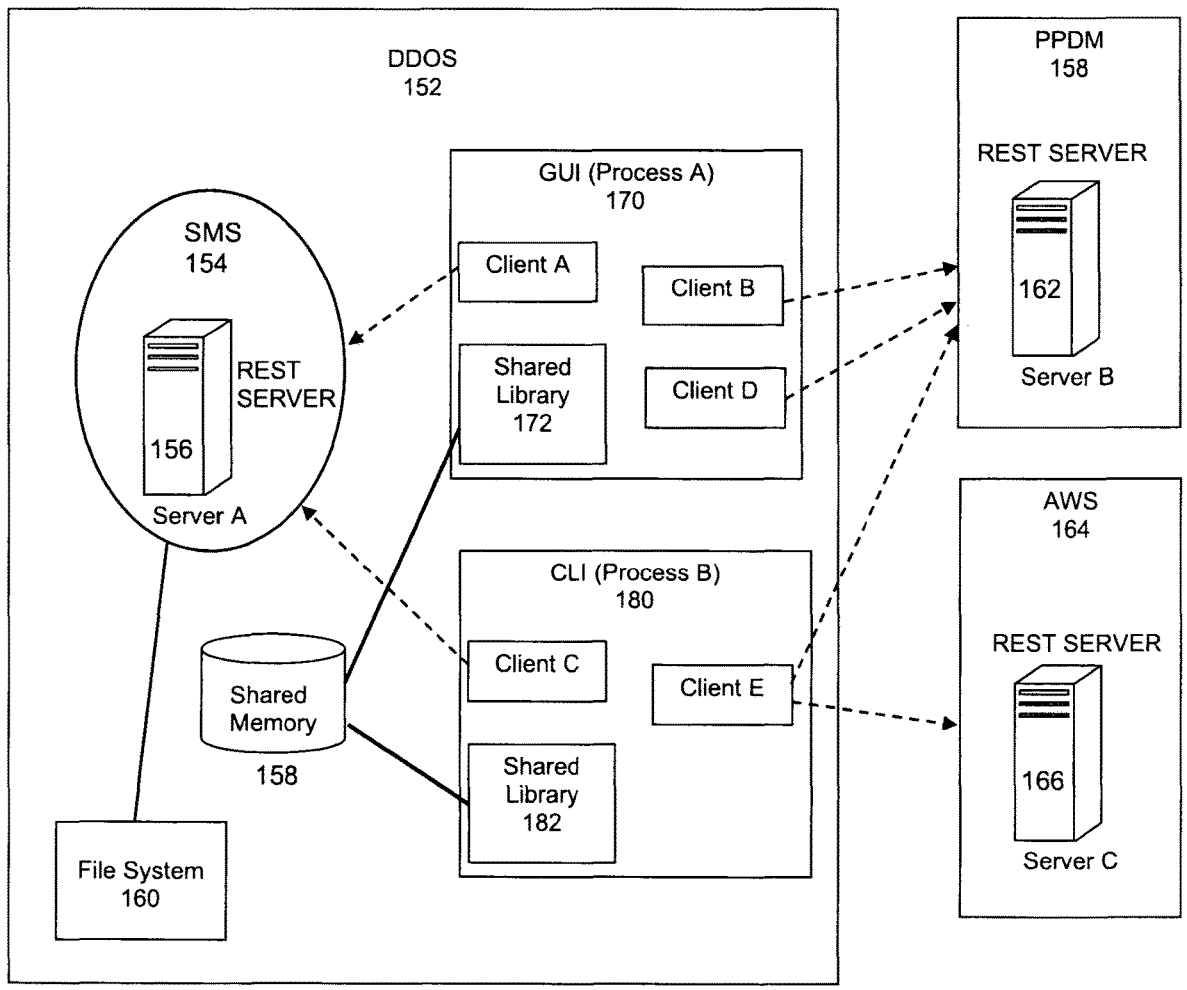
FIG. 1B is a diagram of an on-premises network implementing a multiple REST server authentication process, under some embodiments.

FIG. 1B illustrates an example on-premises system that implements a REST server authentication process, under some embodiments. As shown in FIG. 1B, system 150 comprises an operating system based environment 152, which may be a DDOS or similar OS-based system. The DDOS system 152 includes an application, such as SMS (System Management Service) or similar management process, which acts as a REST server 156 denoted Server A. This application can output data to or through another OS resource, such as file system 160. The application 154 is accessed by two internal DDOS processes, such as a graphical user interface (GUI) denoted Process A, and a command line interface (CLI) denoted Process B. Each process may include one or clients, such as clients A, B, and D in the GUI 170, and clients C and E in the CLI 180. These clients can be spawned to access the different REST resources, such as internal application 154 and external applications, such as PPDM 158, and AWS 164. Each of these external applications is supported by its own respective REST server, 162 and 166, and denoted Server B and Server C, respectively.

FIG. 150 of FIG. 1B illustrates an example general case in which a system can have multiple processes and these processes can each have multiple clients that are used to access one or more different REST servers. For the embodiment of FIG. 1, the authentication of the various REST servers is handled through a shared library process 172, 182 in each process that each access a shared memory 158. FIG. 1B illustrates an embodiment in which a single OS (DDOS 152) with multiple processes (e.g., 170, 180) are implemented in a single on-premises network. It should be noted, however, that such a network environment is scalable to include single-node networks, distributed (multi-node) networks, and so on. For this embodiment, the RESTful APIs used to access the REST servers can be implemented for multiple on-premise locations, in addition to the cloud-based RESTful APIs mentioned above.

To access the resources of cloud network 110 or the on-premises network 150, the client devices must authenticate themselves to provide a valid identity to access the cloud resources. Authentication thus comprises the verification of the user and client machine credentials upon an attempted connection to the network 110. This process generally consists of sending the credentials from the remote access client to the remote access server in an either plaintext or encrypted form by using an authentication protocol.

User authentication for cloud networks typically relies on the use of tokens (e.g., under OAuth 1.0 and OAuth 2.0 protocols), in which a piece of data, embodied in a signed token accompanies each request that is verified by the server for authenticity before it responds to the request. In an embodiment, system 100 may implement one or more tokens for each client including an access token, which is sent like an API key, to allow the application to access a resource, and which can expire after a defined period of time, and a refresh token that can be used to retrieve a new access token if it has expired. In one popular authentication scheme (e.g., OAuth 2.0), the user logs into a system, and the system will then request authentication, usually in the form of a token.

In a cloud network, such as system 100, the user will then forward this request to an authentication server, which will either reject or allow this authentication. From here, the token is provided to the user, and then to the requester. Such a token can then be checked at any time independently of the user by the requester for validation and can be used over time with strictly limited scope and age of validity. The RESTful API often uses GET (read), POST (create), PUT (replace/update), PATCH, and DELETE (to delete a record). With respect to the embodiment of FIG. 1B, the user will generally not forward the request to an authentication server. Instead, the authentication will be performed in an appropriate application server, such as SMS REST server 154.

For the example embodiment of FIG. 1A, network system 100 includes a server 102 that executes a backup management process 112 automates the backup of network data using the target VM devices 104 or other cloud storage 114. Such a process may use full and incremental (or differencing) backup techniques along with a snapshot backup process that is used to store an image or images of the system(s) to be backed up. In an embodiment, system 100 includes a number of virtual machines (VMs) or groups of VMs that are provided to serve as backup targets. Such target VMs may be organized into one or more vCenters (virtual centers) representing a physical or virtual network of many virtual machines (VMs), such as on the order of thousands of VMs each. The VMs serve as target storage devices for data backed up from one or more data sources, such as file system (FS) clients 108. Other data sources having data to be protected and backed up may include other VMs 104 and data in network storage 114.

In an embodiment, the network system of FIG. 1A may be implemented as a DellEMC PowerProtect Data Manager (or similar) data protection system. This is an enterprise-level data protection software platform that automates data backups to tape, disk, and flash-based storage media across physical and virtual environments. A number of different operating systems (e.g., Windows, MacOS, Linux, etc.) are supported through cross-platform supports. Deduplication of backup data is provided by integration with systems such as DellEMC Data Domain and other similar storage solutions. Thus, server 102 may be implemented as a DDR Deduplication Storage server provided by DellEMC Corporation. However, other similar backup and storage systems are also possible. In a general implementation, a number of different users (or subscribers) may use backup management process 112 to back up their data on a regular basis to virtual or physical storage media for purposes of data protection. The saved datasets can then be used in data restore operations to restore any data that may be lost or compromised due to system failure or attack. In a data protection system, the multiple processes can typically comprise multiple backup jobs initiated for different data sources.

Backup management process 112 is an example of a large-scale application utilizing the resources of distributed cloud network 110 and may involve many individual processes embodied in different processing threads and even processor (backup) agents, and that may use a dedicated operating system, such as the Data Domain Operating System (DDOS) by DellEMC.

For such an example embodiment, the multiple processes and/or the multiple network clients (e.g., devices 126-128) each provide authentication tokens that must be managed by the clients. For example, each process/client will submit a certificate, get a token, and manage the token, such as monitor token expiration, and so on. In general, each different resource within the cloud network 110 may be supported and provided by its own server or servers. Thus, clients and processes accessing the network may interface with several different servers. Different servers typically handle token management differently, and so multiple processes require multiple token processing acts within a cloud network.

To alleviate this significant challenge in which each process manages its own token, embodiments provide a shared library to enable a single function call (e.g., put( ) or get( )) to provide token management for multiple different processes and clients. Embodiments for processing authentication tokens in a system with multiple Representational State Transfer (REST) servers and clients. An intelligence algorithm for multiple processes or multiple REST clients in an OS effectively communicates with multiple REST servers and proactively manages each server's authentication token.

In REST systems, a primary data representation is called a 'resource,' which can either be a single element or a collection (or sub-collection). REST APIs use uniform resource identifiers (URIs) to address resources.

Figure 2:
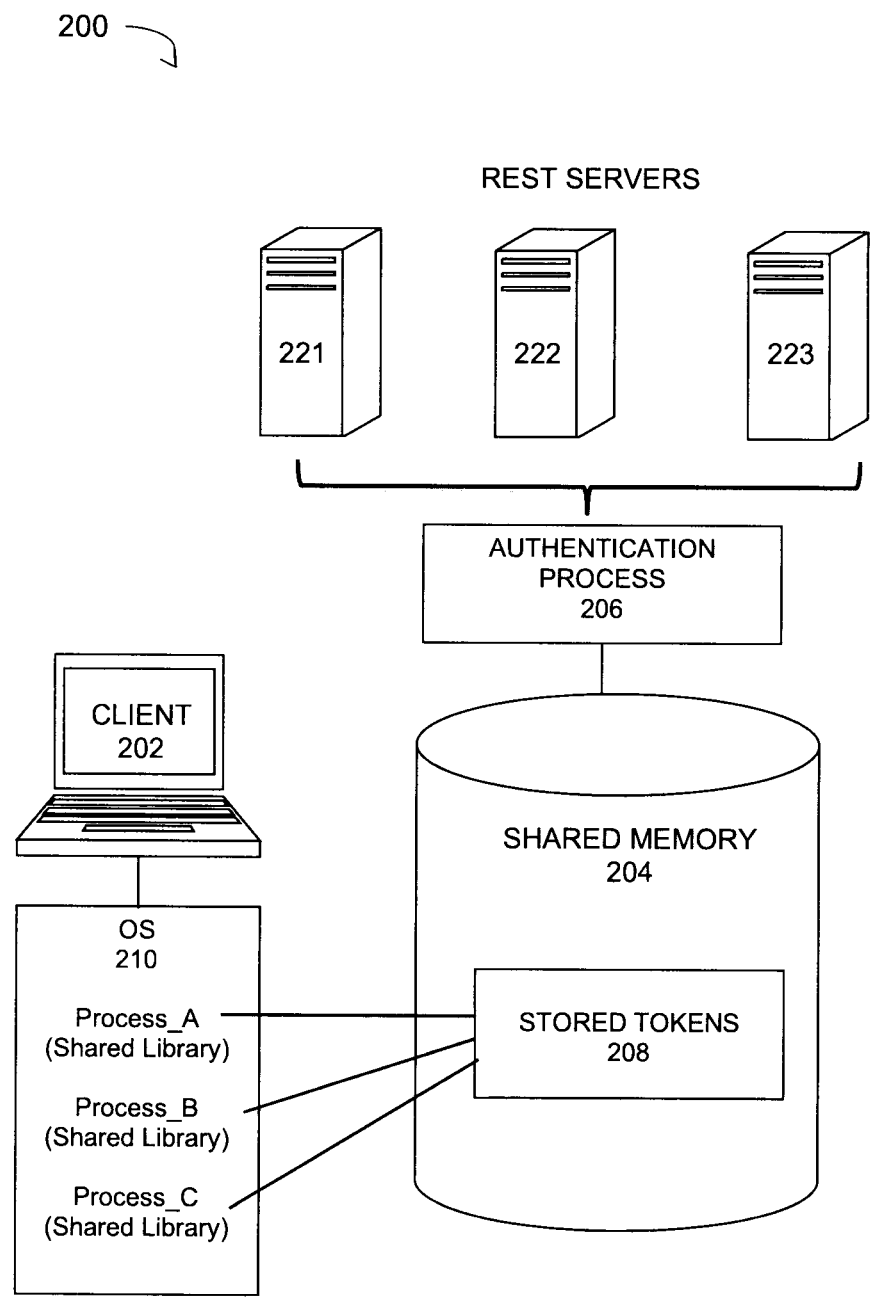
FIG. 2 illustrates a system for processing authentication tokens for multiple REST servers accessed by multiple REST clients or processes, under some embodiments.

FIG. 2 illustrates a system for processing authentication tokens for multiple REST servers accessed by multiple REST clients or processes, under some embodiments. System 200 illustrates a portion of the networks illustrated in either FIG. 1A or 1B, or any other client-server system with multiple REST servers and multiple processes for one or more clients.

As shown in FIG. 2, system 200 includes a number of REST servers 221-223 each having a unique assigned REST token assigned to it under an authentication protocol, such as OAuth 2.0. These servers can represent servers supporting different resources within a cloud network 110, and that are accessed by different processes executed within an OS 210 for a client 202. The processes are denoted Process A, Process B, and Process C, and can correspond to the processes shown in FIG. 1, for example. A shared library is loaded into each process (e.g., Process A, B, C) that uses shared memory 204 (e.g., cloud storage) to store the tokens 208. The shared library manages the generation and expiry of each token and to communicate with a supported REST server through a single function call. The REST authentication token will be generated for each REST server and stored in the shared library which will be reused across multiple processes (e.g., clients 202, 203) that use the library. The REST token will be validated for each function call by an authentication process 206.

In an embodiment, the shared library comprises executable program code that to access the stored tokens 208 that are persisted in the shared memory. This system allows multiple clients in an operating system (e.g., DDOS) to effectively share authentication tokens to connect to multiple REST servers, and greatly simplifies the processing flow for the REST clients to communicate with any supported REST servers by providing a single function to be used from authentication to execution.

In an embodiment, a single function call is used to connect a process to any supported server and get a response. The authentication tokens for the multiple REST servers are shared across multiple processes in an OS 210 by the shared library 204. The authentication process 206 will be able to generate the token by calling a specific authentication mechanism and store it in the shared library 204, where it can be used by other processes if they want to communicate with the same rest server of the multiple rest servers. The shared library is used to manage the token. This shared library may also be referred to as a "REST library" or "shared REST library." Upon authentication or failure/corruption/expiry of the token, the library will generate the token and keep it in the same shared memory.

To make an access request to a server 221-223, a client 202 or 203 invokes a shared library function with the following arguments:

REST Server Name
REST Method (GET/POST/PUT/PATCH/DELETE)
REST URI
REST Body in json / xml format.

The shared library 204 performs the following operation.

Figure 3:
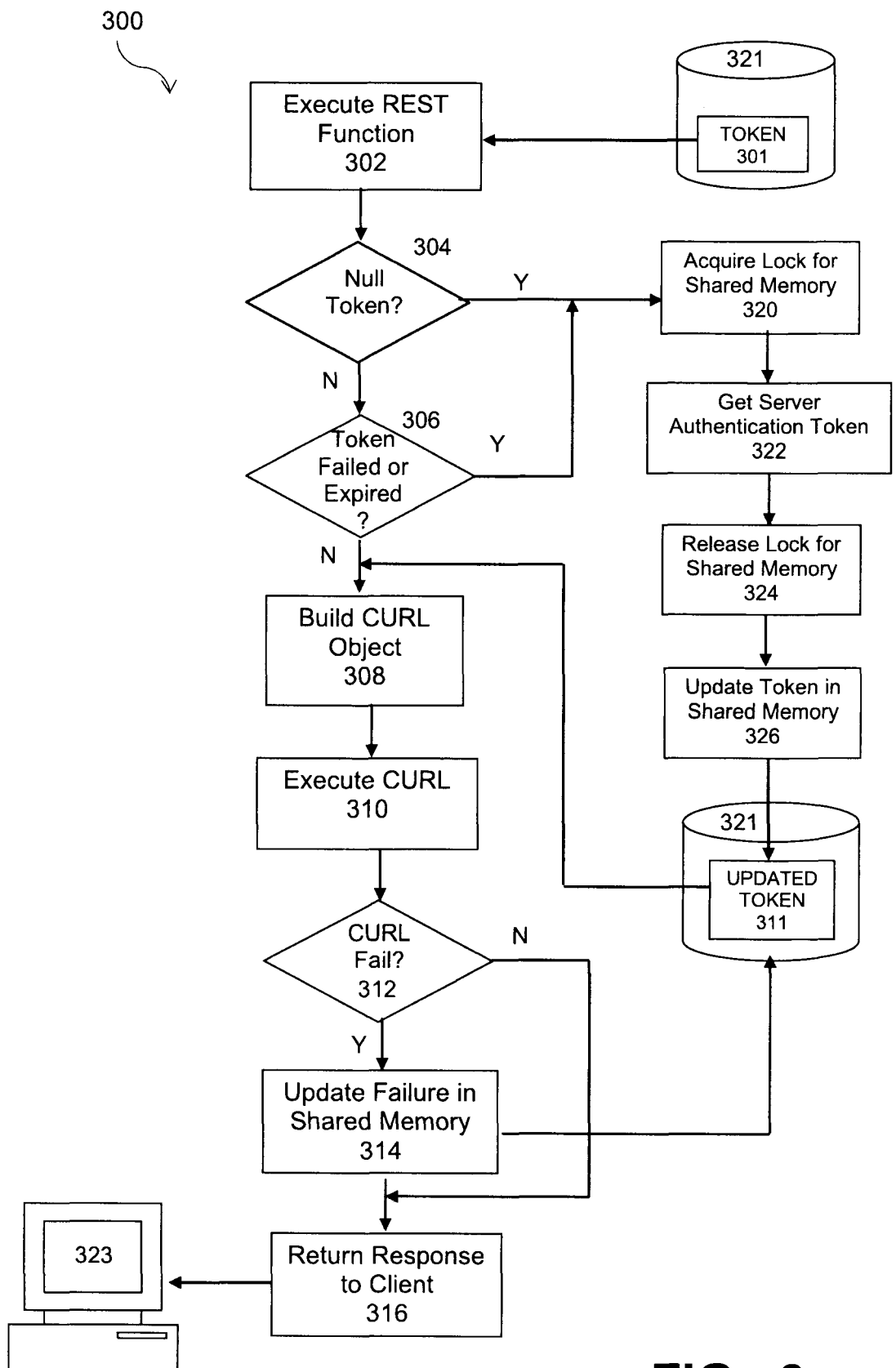
FIG. 3 is a flowchart illustrating a shared library process for processing an authentication token for a REST server, under some embodiments.

Initialize Structure
Check for Token Validity
If Token invalid
    Acquire Lock on the shared memory
        Regenerate the token
    Release the Lock
Build cURL Object
Execute cURL
If cURL response = 401
    update shared memory to refresh the token
Return Response FIG. 3 is a flowchart illustrating a shared library process for processing an authentication token for a REST server, under some embodiments. As shown in FIG. 3, process 300 begins with the REST library 321 executing the REST function 302. This function uses the following arguments: [REST_Server_Name, Headers, HTTP_Method_Type, REST_Body, URI]. It receives the token 301 for the server from the library and determines whether or not it is a null token (304) and whether or not a previous call for the server has failed or if the token 301 is expired, 306. If the token valid (i.e., not null) and has not expired, the process builds a client URL (CURL) object, 308, using the arguments above, where CURL generally refers to a software library for sending and receiving data to and from a REST server. The CURL will return an error if the server is using an unsigned or self-signed certificate or other authorization/authentication failure. If, in step 312, it is determined that there is such an authentication failure, the process will update the failure information in the shared memory 321. After this update, or if the CURL returns a valid response in step 312, the process will then return the response to the client 323, as shown in step 316.

If it is determined in steps 304-306, the token is null or expired, or that a previous call to the server has failed, the REST function gets a new authentication token for the server. This process starts by acquiring the lock for the shared memory, 320. The process stores the current time stamp (Token_Gen_Time) and the new or different authentication token for the server, 322. The lock for the shared memory is then released, 324, and the process proceeds with building the CURL object, 308. The updated token 311 is stored in the shared library of memory 321. The updated token 311 is also used to build the CURL object from step 308, as shown.

Embodiments of the REST function or shared library function shown in FIG. 3 may be implemented in many different ways using appropriate programming code depending on the target computer system. Following is sample program code illustrating an example implementation. It should be noted that such code is provided for purposes of example only, and embodiments are not so limited. Any other programming structure and software code may be used as required.

Pseudo Code for library function:
if (Initialize)
    server_list = create_server_list(supported_server_count) // from Shared Memory
    for i to supported_server_count
        server_list[i].Name = Supported_Server[i] // list of supported servers by the library
        server_list[i].Is_Refresh_Required = true // if this is set to true then token will be re generated
        server_list[i].Token = ""
        server_list[i].Token_Gen_Time = 0 // The local system time when the token gen request is initiated -continued

```
server_list[i].Token_Expire_Seconds = 0 // Time in second that the token is valid for
server_list[i].Auth_Fn_Ref = Server_Auth_Method[i] // It could be a function pointer or a function name in a known format
    index = get_index_for_server(Server_Name)
if (server_list[index].Is_Refresh_Required) OR
(server_list[index].Token_Gen_Time + Time_Now >
server_list[i].Token_Expire_Seconds) // To validate the token
Acquire_Lock_Over_Shared_Memory( )
Auth_Method = server_list[index].Auth_Fn_Ref
Token_Struct = Auth_Method( )
server_list[index].Token = Token_Struct.Token
server_list[index].Token_Gen_Time = Time_Now( )
server_list[index].Token_Expire_Seconds = Token_Struct.ExpiresIn
server_list[i].Is_Refresh_Required = false
Release_Lock_Over_Shared_Memory( )
cURL_Obj = Build_cURL_Object(Token, BODY, URI)
    Response = execute_curl(cURL_Obj)
If Response.Code == 401 :
    server_list[index].Is_Refresh_Required = True
return Response.
```

The function exemplified by the program code above and illustrated in FIG. 3 operate on several different processor elements or components in system 200. These include the operating system (OS) environment of the client or clients, the REST library, the shared memory, and the REST server.

Figure 4:
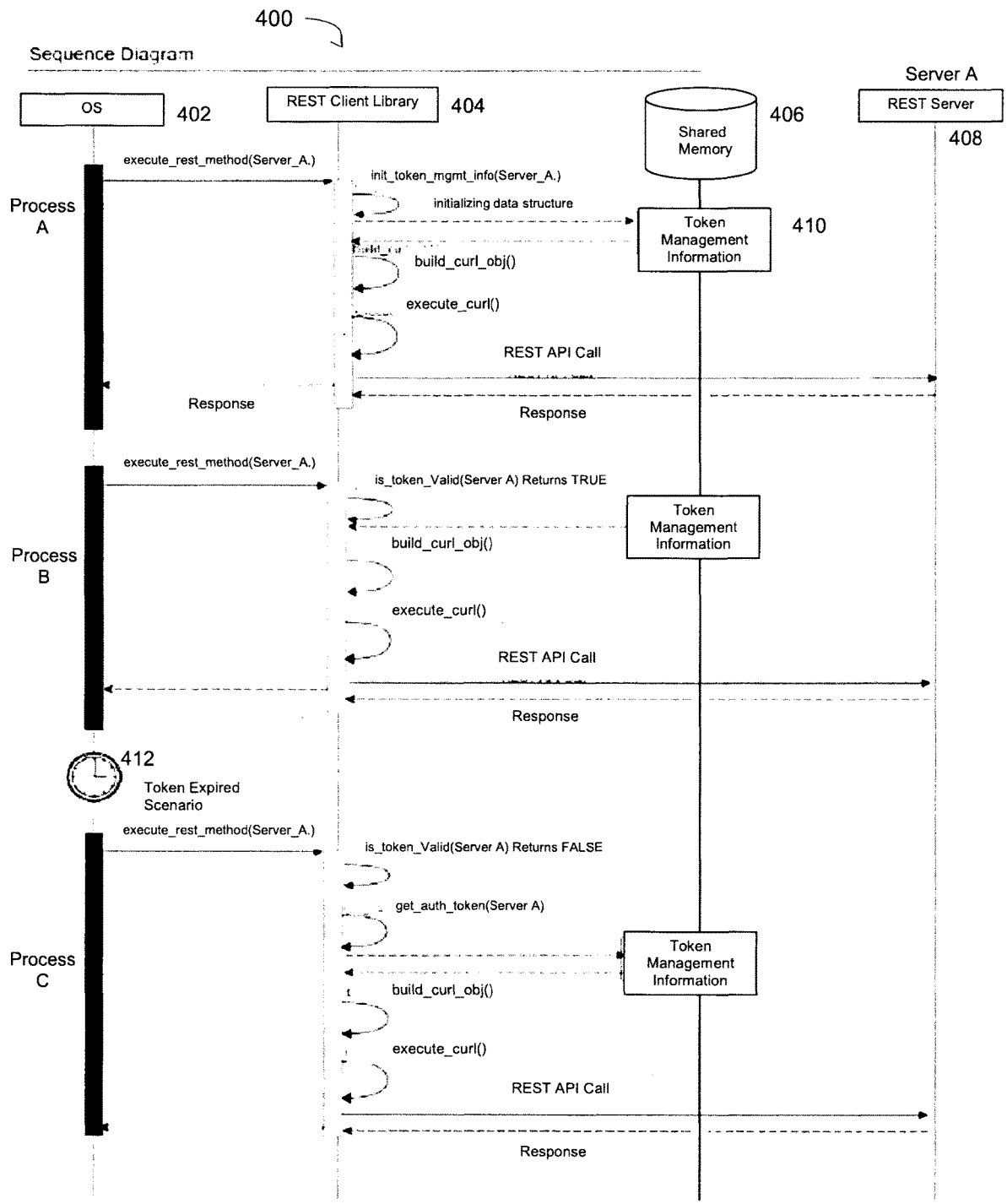
FIG. 4 illustrates an example process of the server authentication token using a shared library under an example embodiment.

FIG. 4 illustrates an example process of the server authentication token using a shared library under an example embodiment. As shown in diagram 400 of FIG. 4, three different OS 402 processes denoted Process A, Process B, and Process C each execute a REST function on the same server, Server A, 408. Shared memory 406 holds the token management information 410 for the process, and the REST client library 404 performs the client request and server authentication functions. In diagram 400, Process A executes the REST process for a request to Server A. The REST client library 404 initializes the token management information 410 in shared memory 406 for this server. Since Server A does not have a current valid token stored, the first initialization returns a null token value to process A. The REST client library initializes the data structure to generate the server authentication token for server A. This new token allows process A to proceed with building and executing the CURL data object for the API call, and Server A can then provide the response back to Process A though the REST client library 404. While the token is still valid, if another process (Process B) makes a request to Server A, the REST client library 404 will return the valid authentication token when Process B executes the REST function. The CURL will then be built and executed for this process and Server A will return the response to Process B. After the defined period of time, the Server A token will expire, as shown for the token expired scenario, 412. In this case, a request from a later process, Process C, will return a False value for the Token_Valid? check. In this case, a new authentication token will be generated for Server A and stored in the Token Management Information of shared memory 406. Process C can then build and execute the CURL for its request to Server A, which can in turn return a response.

Figure 5:
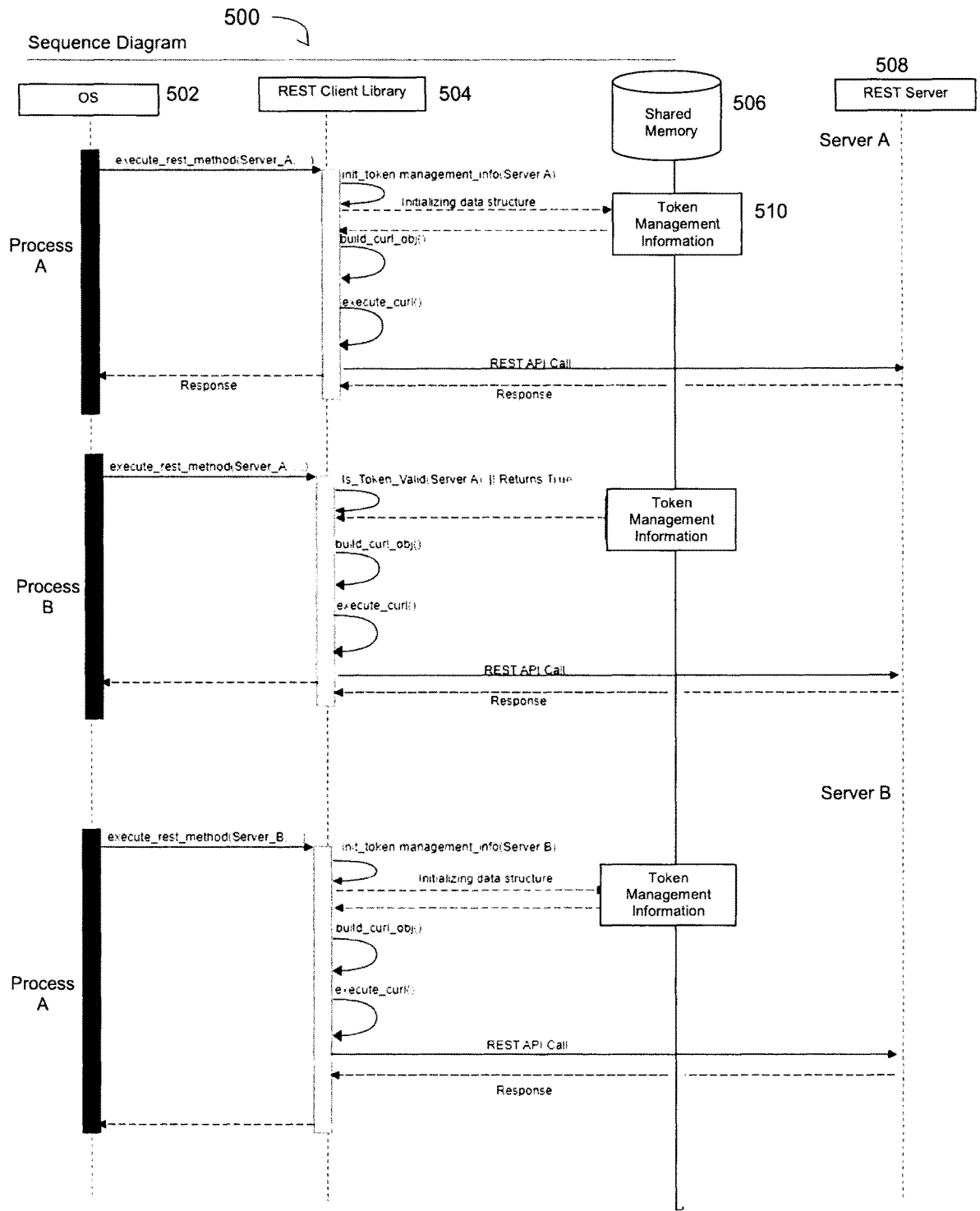
FIG. 5 illustrates an example process of the server authentication token using a shared library under another example embodiment.

FIG. 5 illustrates an example process of the server authentication token using a shared library under another example embodiment. For this example embodiment, two Process A and B make requests to two servers, Server A and Server B. Process A and Process B make requests to Server A as described above, with the initial Process A request generating an authentication token for Server A which is then used by Process A and later Process B request, while the token remains unexpired. If, as shown in process 500, Process A then makes a request to Server B, a new token is generated for Server B. Process A executes the REST function for Server B. The REST client library 504 initializes the token management information 510 in shared memory 506 for this server. Since Server A does not have a current valid token stored, the first initialization returns a null token value to process A. The REST client library initializes the data structure to generate the server authentication token for server B. This new token allows process B to proceed with building and executing the CURL data object for the API call, and Server B can then provide the response back to Process A though the REST client library 504. While the token is still valid, if another process (Process X) makes a request to Server B, the REST client library 504 will return the valid authentication token when this process executes the REST function.

FIGS. 4 and 5 illustrate certain examples of different processes making requests of different servers, and the generation and use of single authentication tokens for the servers using shared memory and a single function call (execute_REST_method(Server_X)). These examples are provided for purpose of illustration only, and any sequence of request/response among any number of OS processes and REST servers in any order or time period are also possible.

In an example embodiment, a single function call to perform a POST operation for AWS may be expressed as: execute_rest_method(AWS, POST, URI, BODY). The single function calls perform the steps of generating the authentication token for the server, building the cURL object (Initializing curl library, set headers, set token, set content type, set body, set Request Type (e.g., as POST), set callback function, set URI, etc.), and executing the cURL.. Thus, the single function call replaces all of these separate steps to perform the token management, regeneration, validation, and secure storing of the server authentication token with one single function call. In this case, it is unnecessary to write N different functions for each of the GET/PUT/POST/PATCH/DELETE functions for N different web service providers (e.g., AWS, Microsoft, Google, IBM, etc.).

FIG. 6 is a table listing some example single function calls to invoke certain REST methods for a process, under some embodiments. FIG. 6 illustrates operations for an example process (e.g., Process A) to call POST and GET methods for AWS (Amazon) and GCP (Google) REST servers, under an example embodiment. Column 602 of table 600 lists the example methods: POST for AWS, GET for AWS, GET for GCP, and POST for GCP, and the single function call 606 performed by embodiments of the shared library function described herein. The corresponding equivalent operations are shown in Column 604. It can be seen that each single function call 606 replaces a significant number of separate operations that must be performed in present token authentication systems. Table 600 of FIG. 6 is provided for purposes of example only, and any other REST methods can be used, along with implementation on any other REST server.

As described above, in an embodiment, system 100 processes that may be implemented as a computer implemented software process, or as a hardware component, or both. As such, it may be an executable module executed by the one or more computers in the network, or it may be embodied as a hardware component or circuit provided in the system. The network environment of FIG. 1A may comprise any number of individual client-server networks coupled over the Internet or similar large-scale network or portion thereof. Each node in the network(s) comprises a computing device capable of executing software code to perform the processing steps described herein.

Figure 7:
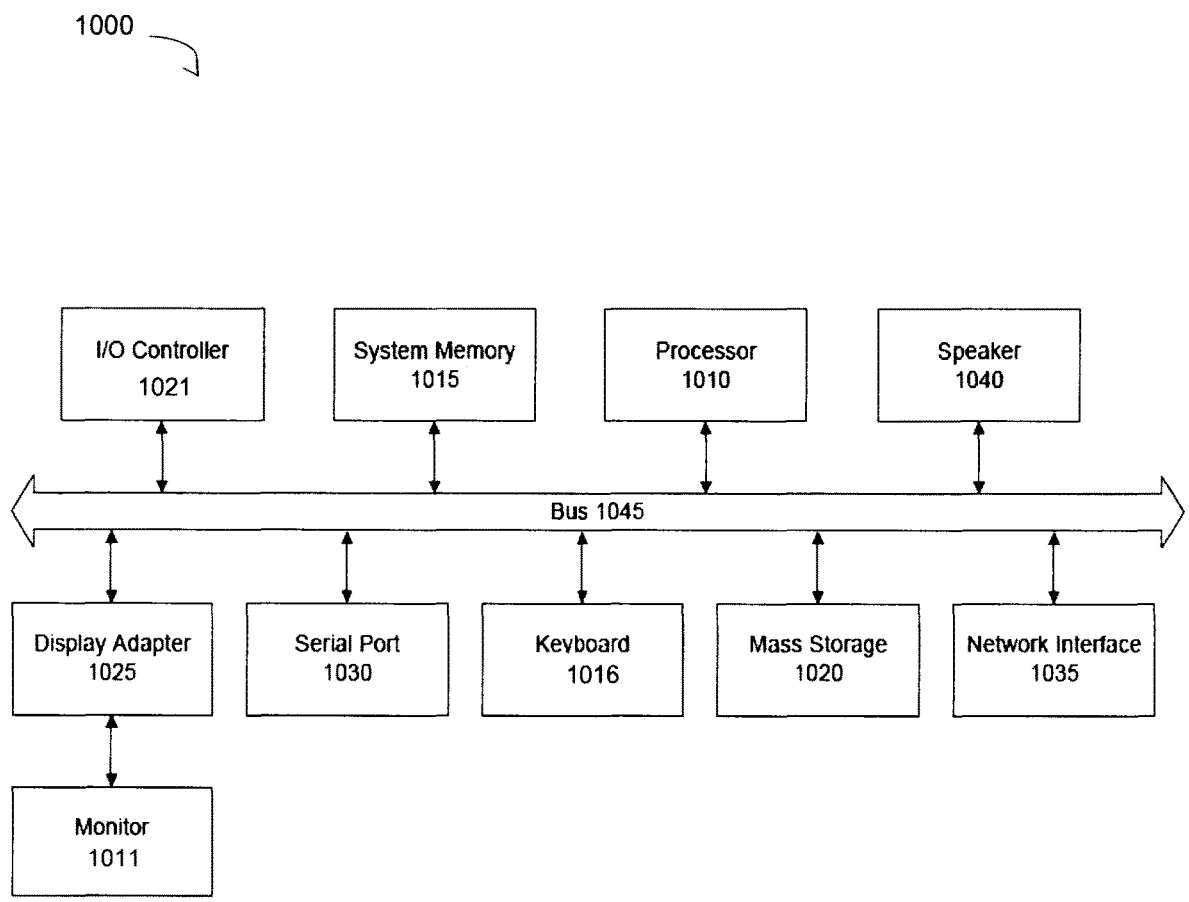
FIG. 7 is a block diagram of a computer system used to execute one or more software components of a system for executing predictive scheduled backups, under some embodiments.

FIG. 7 is a block diagram of a computer system used to execute one or more software components of a system for a REST server authentication token generation and processing method, under some embodiments. The computer system 1000 includes a monitor 1011, keyboard 1016, and mass storage devices 1022. Computer system 1000 further includes subsystems such as central processor 1010, system memory 1015, input/output (I/O) controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1000. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1000 is an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software. An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Although certain embodiments have been described and illustrated with respect to certain example network topographies and node names and configurations, it should be understood that embodiments are not so limited, and any practical network topography is possible, and node names and configurations may be used. Likewise, certain specific programming syntax and data structures are provided herein. Such examples are intended to be for illustration only, and embodiments are not so limited. Any appropriate alternative language or programming convention may be used by those of ordinary skill in the art to achieve the functionality described.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method for processing authentication tokens in a system with multiple Representational State Transfer (REST) servers and clients, comprising:
   providing a shared library loaded into a process that uses shared memory accessed by the clients;
   generating a unique authentication token for a server upon invoking, by a client for the server, a shared library function managing generation and expiry of the authentication token;
   validating the authentication token in a function call for each request of a plurality of different requests by processes of the clients; and
   reusing the authentication token for each of the plurality of different requests prior to expiry of the authentication token.

2. The method of claim 1 wherein the library function uses arguments comprising: a REST server name for the server, a REST method, a REST uniform resource identifier (URI), and a REST body.

3. The method of claim 2 wherein the REST method comprises at least one of a GET, POST, PUT, PATCH, or DELETE operation, and further wherein the REST body is implemented in one of JSON or XML format.

4. The method of claim 1 further comprising:
   re-generating, after expiry of the authentication token, a new authentication upon a function call of a subsequent request; and
   storing the new authentication token in the shared library for a period of time as a valid token defined by a new expiry date.

5. The method of claim 4 further comprising:
   returning, in response to a valid token check, a valid token value for the authentication token prior to expiry;

building, in response to the valid token value, a client uniform resource locator (CURL) data element for the request; and executing the CURL to obtain a response to the request from the server.

6. The method of claim 4 further comprising:

returning, in response to a valid token check, a false token value for the authentication token after the expiry;

regenerating the new authentication token in response to the function call of the subsequent request;

building, in response to the valid token value, a client uniform resource locator (CURL) data element for the request; and executing the CURL to obtain a response to the request from the server.

7. The method of claim 1 wherein the network comprises one of: a cloud network provided by a cloud service provider, and the servers are accessed using uniform resource locator (URL) naming conventions, or an on-premises client-server network, and further wherein the server supports a network resource accessed by the client, and wherein the network resource comprises at least one of storage, processors, applications, and content.

8. The system of claim 1 wherein the system executes a deduplication backup program for backup and restore of data sourced by the clients.

9. A system for processing authentication tokens in a system with multiple Representational State Transfer (REST) servers and clients, comprising:

a shared library loaded into a process that uses shared memory accessed by the clients;

a first processor-based component generating a unique authentication token for a server upon invoking, by a client for the server, a shared library function managing generation and expiry of the authentication token;

a validator validating the authentication token in a function call for each request of a plurality of different requests by processes of the clients; and a second processor based component reusing the authentication token for each of the plurality of different requests prior to expiry of the authentication token.

10. The system of claim 9 wherein the library function uses arguments comprising: a REST server name for the server, a REST method, a REST uniform resource identifier (URI), and a REST body.

11. The system of claim 10 wherein the REST method comprises at least one of a GET, POST, PUT, PATCH, or DELETE operation, and further wherein the REST body is implemented in one of JSON or XML format.

12. The system of claim 9 wherein one of the first or second component:

re-generates, after expiry of the authentication token, a new authentication upon a function call of a subsequent request; and stores the new authentication token in the shared library for a period of time as a valid token defined by a new expiry date.

13. The system of claim 12 wherein one of the first or second component:

returns, in response to a valid token check, a valid token value for the authentication token prior to expiry;

builds, in response to the valid token value, a client uniform resource locator (CURL) data element for the request; and executes the CURL to obtain a response to the request from the server.

14. The system of claim 13 wherein one of the first or second component:

returns, in response to a valid token check, a false token value for the authentication token after the expiry;

regenerates the new authentication token in response to the function call of the subsequent request;

builds, in response to the valid token value, a client uniform resource locator (CURL) data element for the request; and executes the CURL to obtain a response to the request from the server.

15. The system of claim 9 wherein the network comprises one of: a cloud network provided by a cloud service provider, and the servers are accessed using uniform resource locator (URL) naming conventions, or an on-premises client-server network, and further wherein the server supports a network resource accessed by the client, and wherein the network resource comprises at least one of storage, processors, applications, and content.

16. A computer program product, comprising a non-transitory computer-readable medium having a computer-readable program code embodied therein, the computer-readable program code, when executed by one or more processors implements a method of processing authentication tokens in a system with multiple Representational State Transfer (REST) servers and clients, comprising:

providing a shared library loaded into a process that uses shared memory accessed by the clients;

generating a unique authentication token for a server upon invoking, by a client for the server, a shared library function managing generation and expiry of the authentication token;

validating the authentication token in a function call for each request of a plurality of different requests by processes of the clients; and reusing the authentication token for each of the plurality of different requests prior to expiry of the authentication token.

17. The computer program product of claim 16 wherein the library function uses arguments comprising: a REST server name for the server, a REST method, a REST uniform resource identifier (URI), and a REST body.

18. The computer program product of claim 17 wherein the REST method comprises at least one of a GET, POST, PUT, PATCH, or DELETE operation, and further wherein the REST body is implemented in one of JSON or XML format.

19. The computer program product of claim 16 wherein the method further comprises:

re-generating, after expiry of the authentication token, a new authentication upon a function call of a subsequent request; and storing the new authentication token in the shared library for a period of time as a valid token defined by a new expiry date.

20. The computer program product of claim 19 wherein the method further comprises:

returning, in response to a valid token check, a valid token value for the authentication token prior to expiry;

building, in response to the valid token value, a client uniform resource locator (CURL) data element for the request;

executing the CURL to obtain a response to the request from the server;

returning, in response to a valid token check, a false token value for the authentication token after the expiry;

regenerating the new authentication token in response to the function call of the subsequent request;

building, in response to the valid token value, a client uniform resource locator (CURL) data element for the request; and executing the CURL to obtain a response to the request from the server.

\* \* \* \* \*